Aug. 7, 1928.
W. S. GUSTAFSON ET AL
EGG CANDLER
Filed Jan. 15, 1926
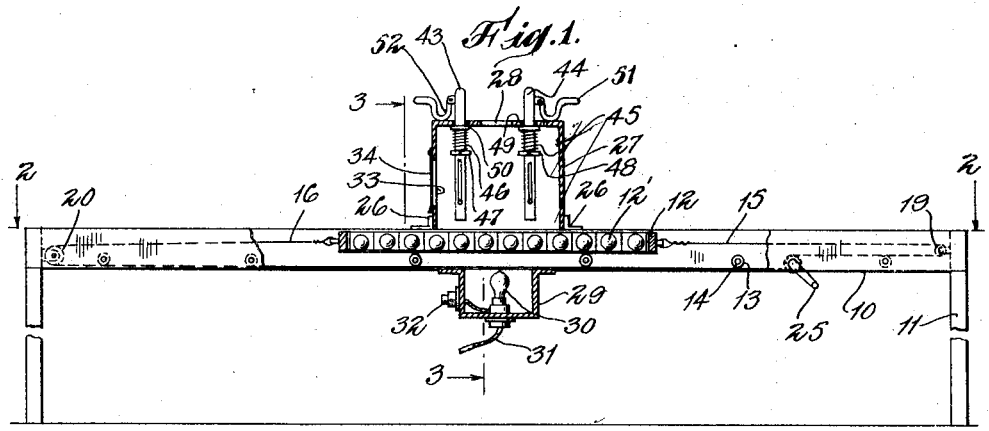
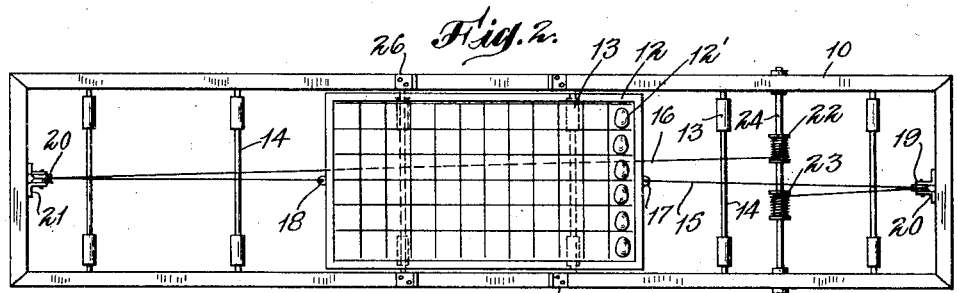
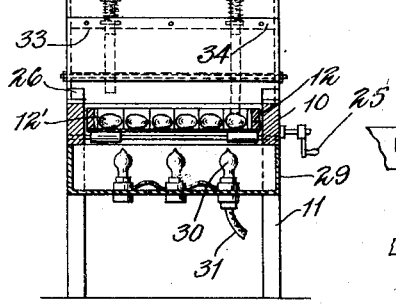
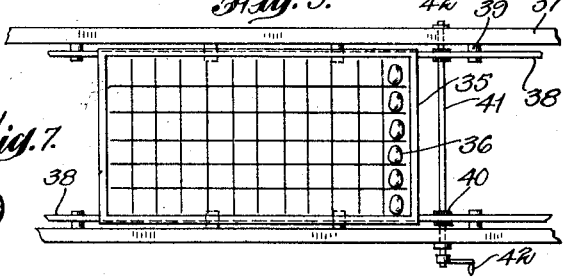
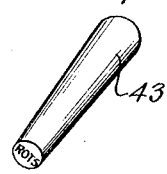
Inventor
Walter S. Gustafson
Edward D. Smith
By their Attorney
George C. Heinitz Patented Aug. 7, 1928.

1,679,769

UNITED STATES PATENT OFFICE.

WALTER S. GUSTAFSON AND EDWARD D. SMITH, OF MANOR, TEXAS.

EGG CANDLER.

Application filed January 15, 1926. Serial No. 81,480.

This invention relates to improvements in egg candlers, and it is the principal object of the invention to provide a machine of this type allowing the testing of a plurality of eggs at one time, and the marking of the same to denote inferior quality.

Another object of the invention is the provision of an egg candler provided with means for receiving and carrying a plurality of eggs above a plurality of lamps and below an inspection housing whereby said eggs receive a step by step reciprocatory motion.

A further object of the invention is the provision of an egg candler of the above described type of simple and inexpensive construction, yet durable and efficient.

A still further object of the invention is the provision of an egg candler the egg receiving tray of which allows a ready inspection and testing of the eggs and is equipped with means for moving the tray slowly in one or the other direction below an inspection housing and above a plurality of lamps which can be illuminated and extinguished as desired.

It is furthermore also one of the objects of the invention to provide an egg candler the inspection housing of which is removably secured to the machine frame and has combined therewith a plurality of stamps for marking the quality of the inspected eggs thereon, while the housing is equipped with suitable side openings allowing a ready handling of the eggs.

These and other objects and advantages of the invention will become more fully known as the description thereof proceeds, and will then be more fully defined in the appended claims.

In the accompanying drawing forming a material part of this disclosure:

Fig. 1 is a sectional side elevation of an egg candler constructed according to the present invention.

Fig. 2 is a top plan view of the same seen in the direction of the arrows 2—2 of Figure 1.

Fig. 3 is a section on line 3—3 of Figure 1.

Fig. 4 is a fragmentary sectional side elevation of a modified form of egg tray reciprocating means.

Fig. 5 is a top plan view thereof.

Figs. 6 and 7 are perspective detail views of stamps used in connection with the egg candler according to the present invention.

The egg candler constructed according to our invention comprises a table or frame 10 supported by a plurality of legs 11. The eggs to be candled are placed on a tray 12 made in convenient size to accommodate for instance six dozen eggs 12' or any other suitable number conveniently to be handled.

This tray is suitably made of a wooden frame enclosing a wire netting receiving in its meshes the eggs to be tested and is adapted to be reciprocated in one or the other direction over a plurality of rollers 13 on cross-bars 14 in frame 10 by means of cables or ropes 15 and 16 respectively.

These cables are attached at one of their ends, the inner one, as at 17 and 18 respectively, to suitable eyes provided on the end bars of the frame of the tray 12. Intermediate their ends the cables are guided over pulleys 19 and 20 respectively arranged in brackets 20, 21 attached to the inner faces of the end bars of frame 10.

The inner ends of the cables or cords 15, 16 are attached to spools 22, 23 on a common shaft 24 transversely arranged in frame 10 and adapted to be operated by means of a crank 25 rotatable in one and the other direction on the end of shaft 24 projecting beyond the frame 10.

To the upper part of the frame 10, in approximately the center thereof, a plurality of brackets 26 are secured for removably receiving a box or housing 27 having in its top an inspection opening 28.

To the lower part of frame 10 a housing 29 is attached in any suitable convenient manner adapted to hold a plurality of lamp sockets for the electric lamps 30 adapted to be attached to a light circuit by means of the cord 31, while a switch 32 is provided for closing and opening the light circuit.

The box 27 has in one of its side walls an opening 33 adapted to be closed by a flap 34 of any suitable material allowing the insertion of the hands into the box for turning the eggs etc.

In the modified form of our invention disclosed in Figures 4 and 5, the tray 35 holding the eggs 36 to be candled is supported in a frame 37 on rack bars 38 moving over suitable rollers 39 by means of gears 40 in mesh with the racks 38 and attached to a transverse shaft 41 carrying at its outer end projecting beyond frame 37 a crank 42 adapted to be turned in one and the other direction for imparting to the tray a reciprocatory motion beneath the inspection opening and above the lamps.

Stamps 43, 44 bearing at their lower ends the inscriptions or legends "Rots" and "Sec." to designate the candled eggs of inferior quality, are introduced through the top of box 27 and have springs 45, 46 wound about their shafts secured with their lower ends to collars 47, 48 on said stamps, while the upper ends of the springs rest against strips 49, 50 secured to the lower face of the top plate of box 27 which is provided with elongated slots for allowing a free movement of the stamps from the rear to the front of the box or vice versa. The stamps are actuated by means of the handles 51, 52 allowing a depression of the stamps to lightly engage the eggs without danger of crushing their shells.

The operation of our device will be understood from the above without further description.

It will be understood that while we have described and shown the preferred forms of our invention as an example of the many ways in which the same may be practically constructed, such changes may be made in the general arrangement and in the construction of the minor details of our invention, as fall within the scope of the appended claim, without departure from the spirit of the invention and the principles involved.

Having thus described our invention, what we claim as new, and desire to secure by Letters Patent is:

In an egg candling apparatus of the class described including a slotted casing, a means for candling a plurality of eggs passed slowly below the slot in said casing, and a means for marking the candled eggs according to their quality, said means comprising a pair of stamps suspended in said casing and displaceable in the slots thereof, collars on said stamps, springs resting with their lower ends upon said collars and wound about said stamps, abutting with their upper ends the casing wall, and curved handles for said stamps for operating the same and for normally keeping the same suspended in the casing by resting on the top of said casing.

Signed at Manor in the county of Travis and State of Texas, this 9th day of January, A. D. 1926.

WALTER S. GUSTAFSON.
EDWARD D. SMITH.